US011019334B2

(12) United States Patent
Hu et al.

(10) Patent No.: US 11,019,334 B2
(45) Date of Patent: May 25, 2021

(54) MULTIPLE ADAPTIVE LOOP FILTER SETS FOR VIDEO CODING

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/931,110

(22) Filed: May 13, 2020

(65) Prior Publication Data

US 2020/0366891 A1   Nov. 19, 2020

Related U.S. Application Data

(60) Provisional application No. 62/849,606, filed on May 17, 2019.

(51) Int. Cl.
*H04N 19/117* (2014.01)
*H04N 19/176* (2014.01)
*H04N 19/82* (2014.01)
*H04N 19/184* (2014.01)
*H04N 19/186* (2014.01)
*H04N 19/463* (2014.01)

(52) U.S. Cl.
CPC ......... *H04N 19/117* (2014.11); *H04N 19/176* (2014.11); *H04N 19/184* (2014.11); *H04N 19/186* (2014.11); *H04N 19/82* (2014.11)

(58) Field of Classification Search
None
See application file for complete search history.

(56) References Cited

FOREIGN PATENT DOCUMENTS

EP   3226562 A1   10/2017
WO   2013059461   4/2013

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19-27, 2019, 374 pages.

(Continued)

*Primary Examiner* — Christopher Braniff
(74) *Attorney, Agent, or Firm* — Shumaker & Sieffert, P.A.

(57) ABSTRACT

Techniques for signaling and decoding adaptive loop filter information is described. A video decoder may be configured to decode a block of the video data, and receive an adaptation parameter sets (APS) in an encoded video bitstream for the block of the video data, wherein the APS includes a plurality of adaptive loop filter sets for luma components of the block of the video data. The video coder may determine an adaptive loop filter from the plurality of adaptive loop filter sets in the APS to apply to the decoded block of the video data, and apply the determined adaptive loop filter to the decoded block of the video data to create a filtered block of the video data.

30 Claims, 11 Drawing Sheets

(56) References Cited

OTHER PUBLICATIONS

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: HTTP://PHENIX.INT-EVRY.FR/JVET/,, No. JVET-A1001 Feb. 24, 2016 (Feb. 24, 2016), XP030150000, 27 pages.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
Hu (QUALCOMM) N., et al., "CE5: Coding Tree Block Based Adaptive Loop Filter (CE5-4)", 14. JVET Meeting, Mar. 19, 2019-Mar. 27, 2019 , Geneva; (The Joint Video Exploration Team OF ISO/IEC JTC1/SC29/WG11 AND ITU-T SG.16, No. JVET-N0415, Mar. 19, 2019 (Mar. 19, 2019), XP030203721, 15 pages, Retrieved from the Internet: URL: http://phenix.int-evry.fr/jvet/doc_end_user/documents/14_Geneva/wg11/JVET-N0415-v2.zip JVET-N0415-v2.docx [retrieved on Mar. 19, 2019], cited in the application, sections 2 and 6.
International Search Report and Written Opinion—PCT/US2020/032858—ISA/EPO—Sep. 2, 2020.

Diagonal

Vertical Flip

Rotation

MULTIPLE ADAPTIVE LOOP FILTER SETS FOR VIDEO CODING

This application claims the benefit of U.S. Provisional Application No. 62/849,606, filed May 17, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to adaptive loop filters (ALFs). In particular, this disclosure describes various techniques for signaling and decoding luma and/or chroma adaptive loop filters for blocks of video data (e.g., coding tree blocks). In some examples, this disclosure describes techniques for signaling and decoding adaptive loop filter information, including adaptive loop filter information for multiple adaptive loop filter sets, in one or more adaptation parameter sets (APSs). The adaptive loop filter information may include one or more of adaptive loop filter sets, adaptive loop filter coefficients, merging tables, and/or clipping values. The techniques of the disclosure may improve coding efficiency and/or reduce distortion in decoded/reconstructed video data by providing additional flexibility in selecting possible adaptive loop filters to apply for both luma and chroma components of video data.

The techniques of this disclosure may be applied to extensions to any of the existing video codecs, such as extensions to High Efficiency Video Coding (HEVC), or part of standards currently being developed, such as Versatile Video Coding (VVC), and to other future video coding standards.

In one example, this disclosure describes an apparatus configured to decode video data, the apparatus comprising a memory configured to store the video data, and one or more processors in communication with the memory, the one or more processors configured to decode a block of the video data, receive an adaptation parameter sets (APS) in an encoded video bitstream for the block of the video data, wherein the APS includes a plurality of adaptive loop filter sets for luma components of the block of the video data, determine an adaptive loop filter from the plurality of adaptive loop filter sets in the APS to apply to the decoded block of the video data, and apply the determined adaptive loop filter to the decoded block of the video data to create a filtered block of the video data.

In another example, this disclosure describes a method for decoding video data, the method comprising decoding a block of the video data, receiving an APS in an encoded video bitstream for the block of the video data, wherein the APS includes a plurality of adaptive loop filter sets for luma components of the block of the video data, determining an adaptive loop filter from the plurality of adaptive loop filter sets in the APS to apply to the decoded block of the video data, and applying the determined adaptive loop filter to the decoded block of the video data to create a filtered block of the video data.

In another example, this disclosure describes an apparatus configured to encode video data, the apparatus comprising a memory configured to store the video data, and one or more processors in communication with the memory, the one or more processors configured to encode a block of the video data, reconstruct the block of the video data, apply an adaptive loop filter to the reconstructed block of the video data to create a filtered block of the video data, and signal an APS in an encoded video bitstream for the block of the video data, wherein the APS includes a plurality of adaptive loop filter sets, including the applied adaptive loop filter, for luma components of the block of the video data.

In another example, this disclosure describes a method of encoding video data, the method comprising encoding a block of the video data, reconstructing the block of the video data, applying an adaptive loop filter to the reconstructed block of the video data to create a filtered block of the video data, and signaling an APS in an encoded video bitstream for the block of the video data, wherein the APS includes a plurality of adaptive loop filter sets, including the applied adaptive loop filter, for luma components of the block of the video data.

The details of one or more examples are set forth in the accompanying drawings and the description below. Other features, objects, and advantages will be apparent from the description, drawings, and claims.

DETAILED DESCRIPTION

In general, this disclosure describes techniques related to adaptive loop filters (ALFs). In particular, this disclosure describes various techniques for signaling and decoding luma and/or chroma adaptive loop filters for blocks of video data (e.g., coding tree blocks). In some examples, this disclosure describes techniques for signaling and decoding adaptive loop filter information, including adaptive loop filter information for multiple adaptive loop filter sets, in one or more adaptation parameter sets (APSs). The adaptive loop filter information may include one or more of adaptive loop filter sets, adaptive loop filter coefficients, merging tables, and/or clipping values. The techniques of the disclosure may improve coding efficiency and/or reduce distortion in decoded/reconstructed video data by providing additional flexibility in selecting possible adaptive loop filters to apply for both luma and chroma components of video data.

Figure 1:
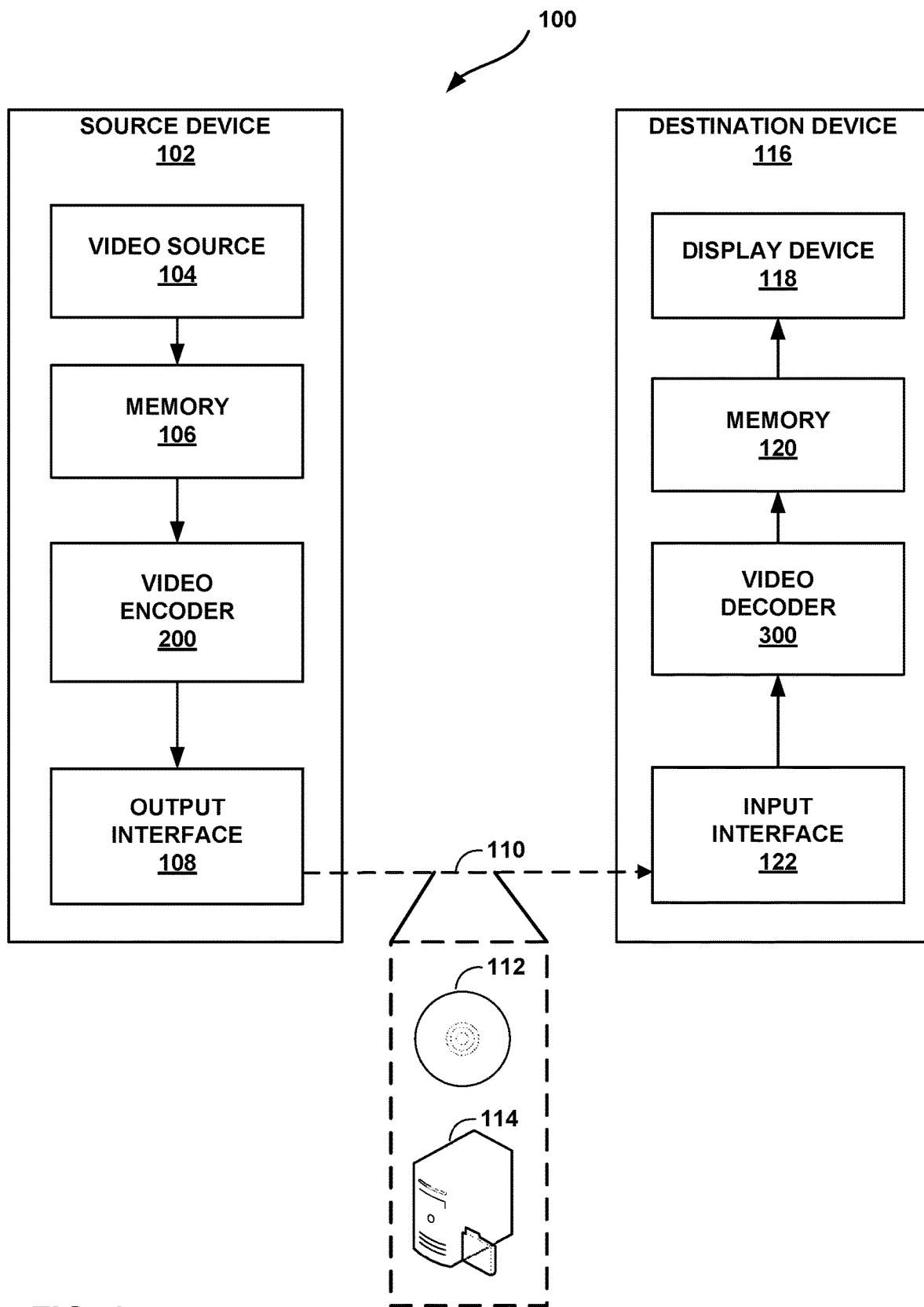
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for adaptive loop filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116.

In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v5 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks.

Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, as will be explained in more detail below, video encoder 200 may be configured to encode a block of the video data, reconstruct the block of the video data, apply an adaptive loop filter to the reconstructed block of the video data to create a filtered block of the video data, and signal an adaptation parameter sets (APS) in an encoded video bitstream for the block of the video data, wherein the APS includes a plurality of adaptive loop filter sets, including the applied adaptive loop filter, for luma components of the block of the video data. In a reciprocal fashion, video decoder 300 may be configured to decode a block of the video data, receive an adaptation parameter sets (APS) in an encoded video bitstream for the block of the video data, wherein the APS includes a plurality of adaptive loop filter sets for luma components of the block of the video data, determine an adaptive loop filter from the plurality of adaptive loop filter sets in the APS to apply to the decoded block of the video data, and apply the determined adaptive loop filter to the decoded block of the video data to create a filtered block of the video data.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
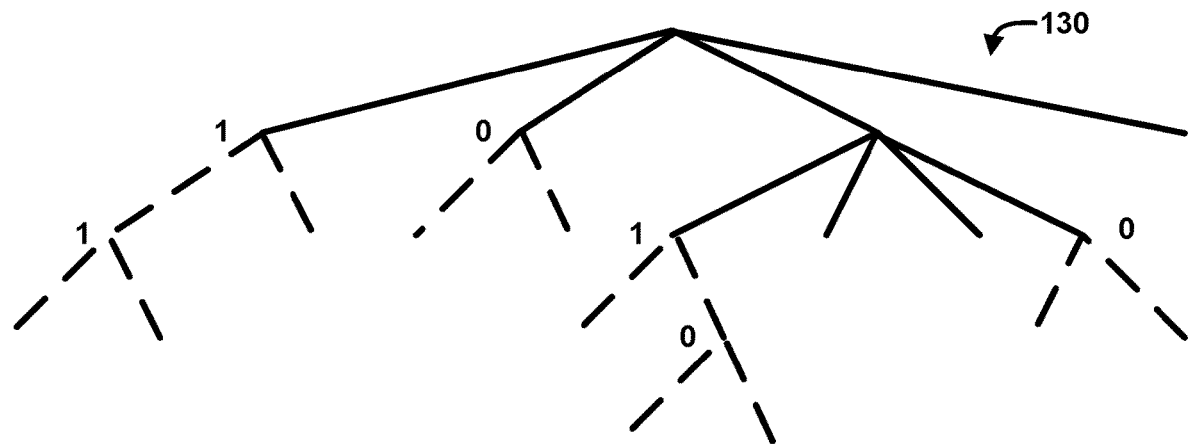
FIGS. 2A and 2B are conceptual diagrams illustrating an example quadtree binary tree (QTBT) structure, and a corresponding coding tree unit (CTU).
Figure 2B:
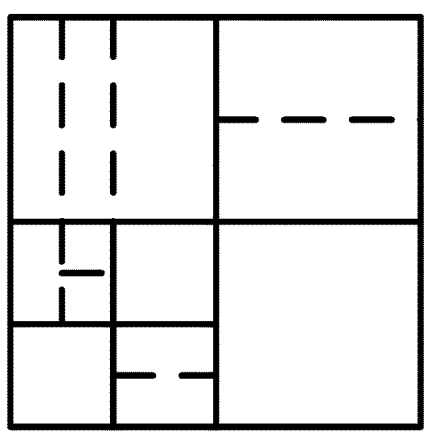

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
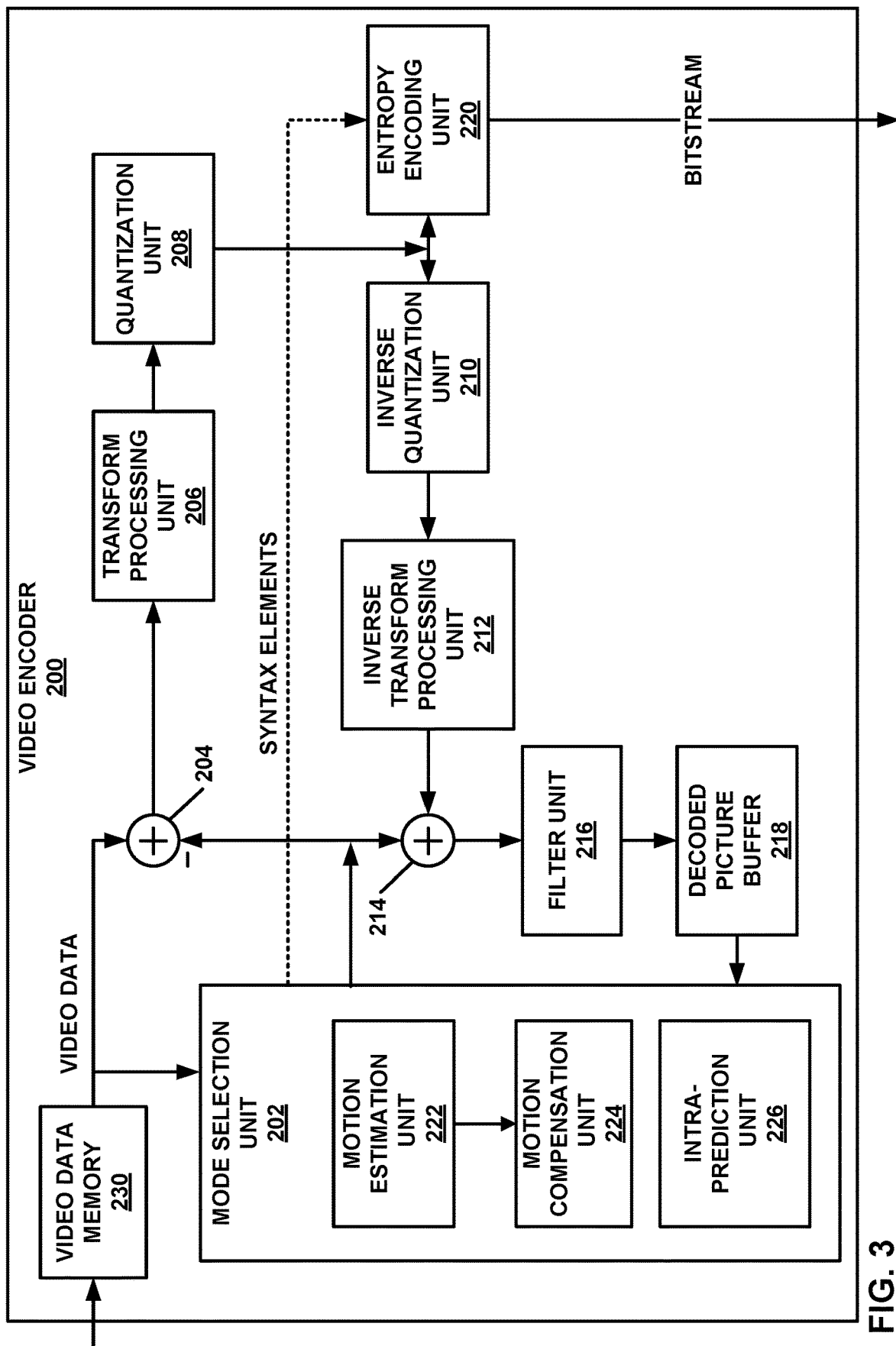
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction.

Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Filter unit 216 may also perform one or more of the techniques of this disclosure for determining and applying adaptive loop filters, as will be described in more detail below. Operations of filter unit 216 may be skipped, in some examples.

In accordance with the techniques of this disclosure, as will be explained in more detail below, filter unit 216 may be configured to perform one or more techniques of the disclosure. For example, video encoder 200 may be configured to encode a block of the video data, and reconstruct the block of the video data using any of the prediction techniques described above or other encoding techniques. Filter unit 216 may be configured to apply an adaptive loop filter to the reconstructed block of the video data to create a filtered block of the video data, and signal an adaptation parameter sets (APS) in an encoded video bitstream for the block of the video data, wherein the APS includes a plurality of adaptive loop filter sets, including the applied adaptive loop filter, for luma components of the block of the video data.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode a block of the video data, reconstruct the block of the video data, apply an adaptive loop filter to the reconstructed block of the video data to create a filtered block of the video data, and signal an adaptation parameter sets (APS) in an encoded video bitstream for the block of the video data, wherein the APS includes a plurality of adaptive loop filter sets, including the applied adaptive loop filter, for luma components of the block of the video data.

Figure 4:
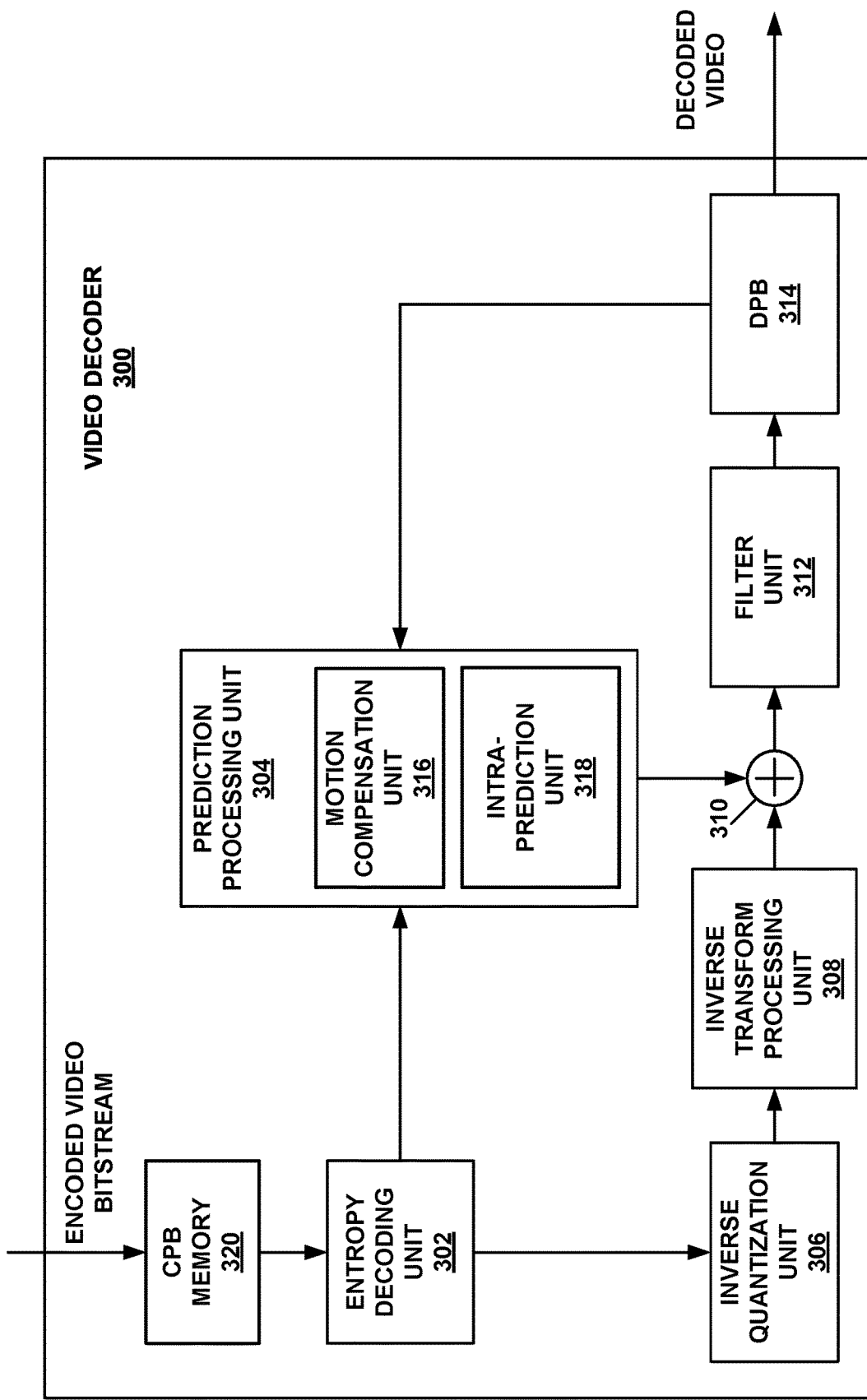
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Filter unit 312 may also perform one or more of the techniques of this disclosure for determining and applying adaptive loop filters, as will be described in more detail below. Operations of filter unit 312 are not necessarily performed in all examples.

As will be explained in more detail below, filter unit 312 may be configured to perform the techniques of this disclosure. For example, video decoder 300 may be configured to decode a block of the video data, and receive an adaptation parameter sets (APS) in an encoded video bitstream for the block of the video data, wherein the APS includes a plurality of adaptive loop filter sets for luma components of the block of the video data. Filter unit 312 may be configured to determine an adaptive loop filter from the plurality of adaptive loop filter sets in the APS to apply to the decoded block of the video data, and apply the determined adaptive loop filter to the decoded block of the video data to create a filtered block of the video data.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to decode a block of the video data, receive an adaptation parameter sets (APS) in an encoded video bitstream for the block of the video data, wherein the APS includes a plurality of adaptive loop filter sets for luma components of the block of the video data, determine an adaptive loop filter from the plurality of adaptive loop filter sets in the APS to apply to the decoded block of the video data, and apply the determined adaptive loop filter to the decoded block of the video data to create a filtered block of the video data.

As described above, the example techniques described in this disclosure are related to adaptive loop filters. The following provides additional information regarding adaptive loop filtering.

Adaptive Loop Filters in VVC Test Model 5.0 (VTM-5.0)

In the field of video coding, it is common to apply filtering in order to enhance the quality of a decoded/reconstructed video signal. The filter can be applied as a post-filter, where a filtered frame is not used for prediction of future frames. In other examples, the filter can be applied as an in-loop filter, where the filtered frame is used to predict future frame (e.g., filter unit 216 and filter unit 312 in FIGS. 3 and 4, respectively). Accordingly, even in examples where video encoder 200 is not configured to display the picture, video encoder 200 may be configured to perform the adaptive loop filter techniques (e.g., via filter unit 216) as part of the in-loop filter. Video decoder 300 may be configured to perform the adaptive loop filter techniques (e.g., via filter unit 312) for in-loop filtering, or filter unit 312 may be on the output of DPB 314 as a post-filter (or some combination of in-loop and post-filter). A filter can be designed, for example, by minimizing the error between the original signal and the decoded filtered signal. In this disclosure, a reconstructed block or picture may refer to output of reconstruction unit 214 of video encoder 200. A decoded block or picture may refer to the output of reconstruction unit 310 of video decoder 300.

Adaptive Loop Filter with Clipping

In VTM-5.0, the decoded filter coefficients f (k,l) and clipping values c(k,l) are applied to the decoded/reconstructed image R(i,j) as follows:

$$\tilde{R}(i,j)=R(i,j)+\Sigma_{k,l=(-K,-K),k,l=(0,0)}^{K,K}f(k,l)*\text{clip3}(-c(k,l),c(k,l),R(i+k,j+l)-R(i,j)) \quad (1)$$

Figure 5:
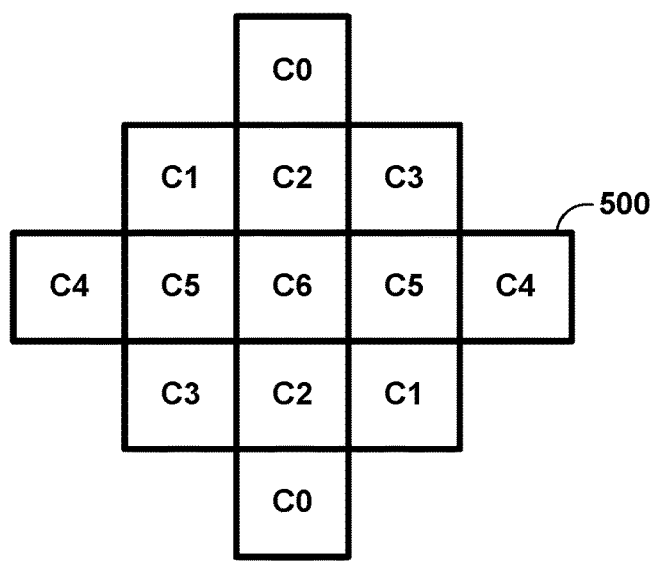
FIG. 5 is a conceptual diagram illustrating example adaptive loop filter supports.
Figure 5:
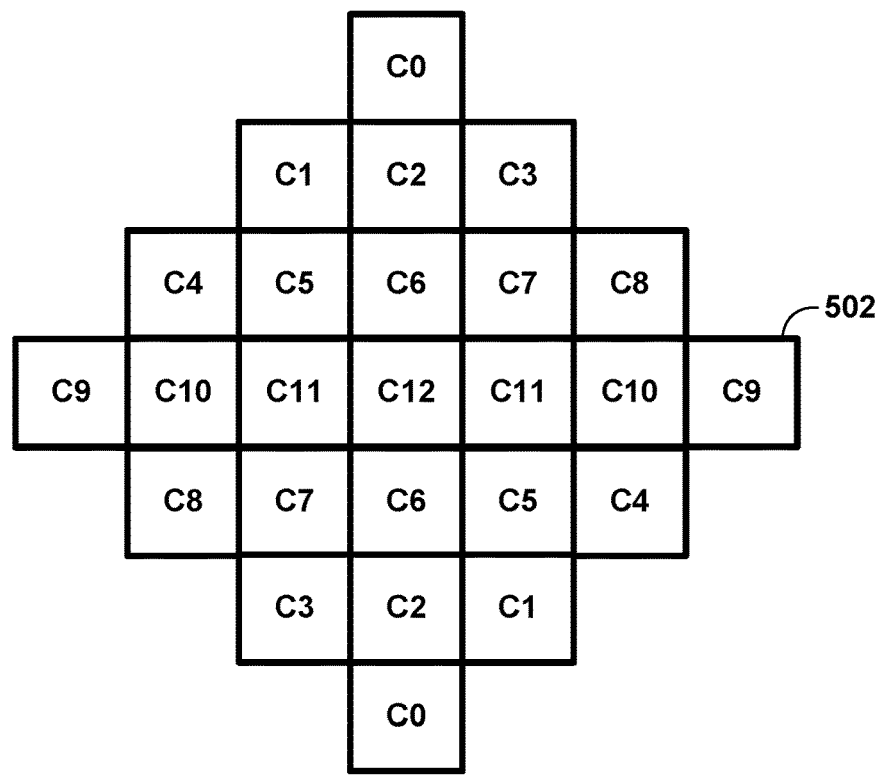

In some examples, video encoder 200 and video decoder 300 may be configured to apply a 7×7 filter to luma components of a block and apply a 5×5 filter to chroma components of a block. FIG. 5 is a conceptual diagram illustrating example adaptive loop filter supports. As shown in FIG. 5, adaptive loop filter support 500 is a 5×5 diamond filter support and adaptive loop filter support 502 is a 7×7 diamond filter support, where the C# values are filter coefficients.

Pixel Classification

For the luma component of a block, video encoder 200 and video decoder 300 may be configured to classify 4×4 blocks in the whole picture based on a 1D Laplacian direction (up to 5 directions) and a 2D Laplacian activity (up to 5 activity values). Video encoder 200 and video decoder 300 may be configured to further quantize the calculation of direction $Dir_b$ and unquanitzed activity $Act_b$. As one example, $Act_b$ is quantized to the range of 0 to 4, inclusively.

First, video encoder 200 and video decoder 300 may be configured to calculate values of two diagonal gradients, in addition to the horizontal and vertical gradients used in the existing adaptive loop filter (e.g., in VVC Draft 5), using a 1-D Laplacian. As can be seen from equations (2) to (5) below, video encoder 200 and video decoder 300 may be configured to uses the sum of gradients of all pixels within an 8×8 window that covers a target pixel as the represented gradient of target pixel, where R(k,l) is the reconstructed pixels at location (k,l) and indices i and j refer to the coordinates of the upper left pixel in the 4×4 block. Each pixel is associated with four gradient values, with vertical gradient denoted by $g_v$, horizontal gradient denoted by $g_h$, 135 degree diagonal gradient denoted by $g_{d1}$, and 45 degree diagonal gradient denoted by $g_{d2}$.

$$g_v = \sum_{k=i-2}^{i+5} \sum_{l=j-2}^{j+3} V_{k,l}, \quad (2)$$

$V_{k,l}=|2R(k,l)-R(k,l-1)-R(k,l+1)|$, if k and l are both even numbers, or both k and l are not even numbers. Otherwise, 0.

$$g_h = \sum_{k=i-2}^{i+5} \sum_{l=j-2}^{j+5} H_{k,l}, \quad (3)$$

$H_{k,l}=|2R(k,l)-R(k-1,l)+R(k+1,l)|$, if k and l are both numbness, or both k and l are not even numbers. Otherwise, 0.

$$g_{d1} = \sum_{k=i-2}^{i+5} \sum_{l=j-2}^{j+5} D1_{k,l}, \quad (4)$$

$D1_{k,l}=|2R(k,l)-R(k-1,l-1)-R(k+1,l-1)|$, if k and l are both even numbers, or both k and l are not even numbers. Otherwise, 0.

$$g_{d2} = \sum_{k=i-2}^{i+5} \sum_{l=j-2}^{j+5} D2_{k,l}, \quad (5)$$

$D2_{k,l}=|2R(k,l)-R(k-1,l+1)-R(k+1,l-1)|$, if k and l are both even numbers, or both k and l are not even numbers. Otherwise, 0.

To assign the directionality $Dir_b$, video encoder 200 and video decoder 300 may be configured to compare the ratio of the maximum and minimum of the horizontal and vertical gradients, denoted by $R_{h,v}$ in (6) and the ratio of maximum and minimum of two diagonal gradients, denoted by $R_{d1,d2}$ in (7) against each other with two thresholds $t_1$ and $t_2$.

$$R_{h,v} = g_{h,v}^{max} / g_{h,v}^{min} \quad (6)$$

wherein $g_{h,v}^{max} = \max(g_h, g_v), g_{h,v}^{min} = \min(g_h, g_v)$, $$R_{d0,d1} = g_{d0,d1}^{max} / g_{d0,d1}^{min} \quad (7)$$

wherein $g_{d0,d1}^{max} = \max(g_{d0}, g_{d1}), g_{d0,d1}^{min} = \min(g_{d0}, g_{d1})$ By comparing the detected ratios of horizontal/vertical and diagonal gradients, five direction modes, i.e., $Dir_b$ within the range of [0, 4] inclusive, are defined in equation (8). The values of $Dir_b$ and their physical meaning are described in Table 1.

$$D = \begin{cases} 0 & R_{h,v} \le t_1 \text{ \&\& } R_{d0,d1} \le t_1 \\ 1 & R_{h,v} > t_1 \text{ \&\&} R_{h,v} > R_{d0,d1} \text{ \&\& } R_{h,v} > t_2 \\ 2 & R_{h,v} > t_1 \text{ \&\& } R_{h,v} > R_{d0,d1} \text{ \&\& } R_{h,v} \le t_2 \\ 3 & R_{d0,d1} > t_1 \text{ \&\& } R_{h,v} \le R_{d0,d1} \text{ \&\& } R_{d0,d1} > t_2 \\ 4 & R_{d0,d1} > t_1 \text{ \&\& } R_{h,v} \le R_{d0,d1} \text{ \&\& } R_{d0,d1} \le t_2 \end{cases} \quad (8)$$

TABLE 1

Values of Direction and Their Physical Meaning

| Direction values | physical meaning |
|---|---|
| 0 | Texture |
| 1 | Strong horizontal/vertical |
| 2 | horizontal/vertical |
| 3 | strong diagonal |
| 4 | diagonal |

Video encoder 200 and video decoder 300 may be configured to calculate the activity value Act as:

$$Act = \sum_{k=i-3}^{i+4} \sum_{l=j-3}^{j+4} (V_{k,l} + H_{k,l}). \quad (9)$$

Video encoder 200 and video decoder 300 may be configured to further quantize the value of Act to the range of 0 to 4, inclusive, and the quantized value is denoted as $\hat{A}$.

Quantization Process from Activity Value Act to Activity Index $\hat{A}$

The quantization process is defined as follows:

avg_var=Clip_post(NUM_ENTRY-1,
(Act*ScaleFactor)>>shift);$\hat{A}$=ActivityToIndex
[avg_var]

wherein NUM_ENTRY is set to 16, ScaleFactor is set to 64, shift is (4+internal coded-bitdepth), ActivityToIndex[NUM_ENTRY]={0, 1, 2, 2, 2, 2, 2, 3, 3, 3, 3, 3, 3, 3, 3, 4}, function Clip_post(a, b) returns the smaller value between a and b.

In total, video encoder 200 and video decoder 300 may be configured to categorize each 4×4 luma block into one out of 25 (5×5) classes and assign an index to each 4×4 block according the value of $Dir_b$ and $Act_b$ of the block. Video encoder 200 and video decoder 300 may be configured to denote the group index by C and is set equal to $5Dir_b + \hat{A}$ wherein A is the quantized value of $Act_b$.

Geometry Transformations

In some examples, for each category, video encoder 200 may be configured to code and signal one set of filter coefficients and clipping values. To better distinguish different directions of blocks marked with the same category index, four geometry transformations, including no transformation, diagonal, vertical flip, and rotation, may be used.

Figure 6:
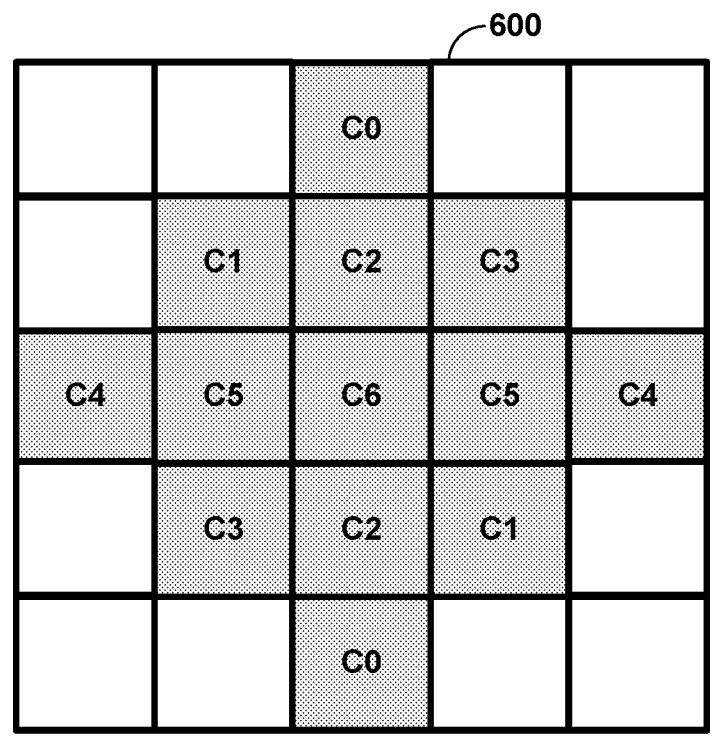
FIG. 6 is a conceptual diagram illustrating an example 5×5 diamond-shaped filter support.
Figure 7:
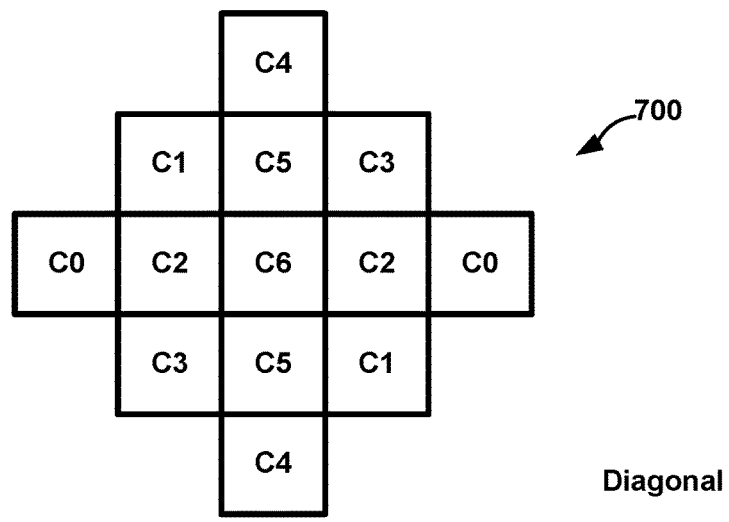
FIG. 7 is a conceptual diagram illustrating example geometry transformations.
Figure 7:
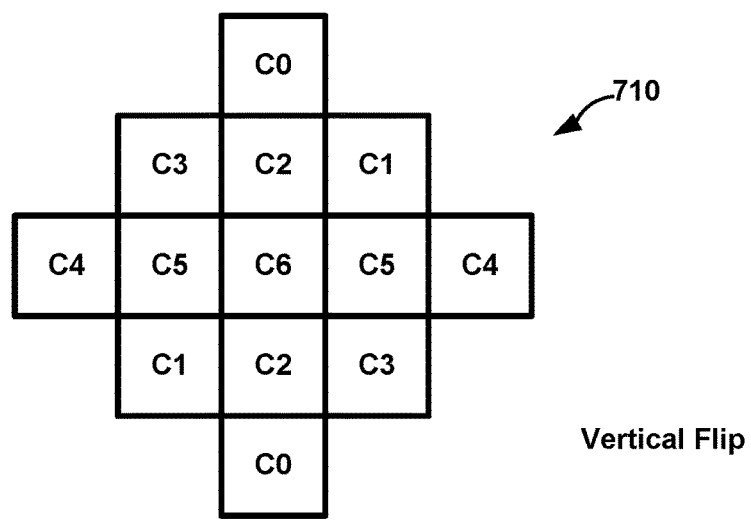
Figure 7:
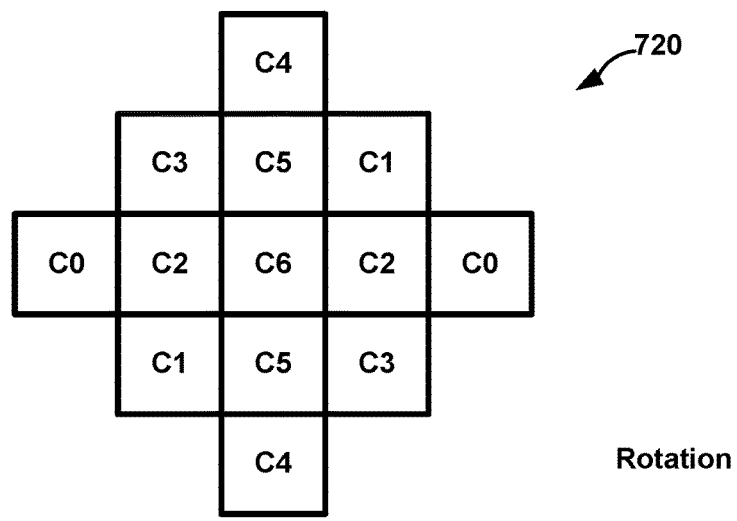

FIG. 6 is a conceptual diagram illustrating an example 5×5 diamond-shaped filter support 600. An example of a 5×5 filter support with the three geometric transformations is depicted in FIG. 7, including a diagonal transformation 700, a vertical flip transformation 710, and a rotation transform 720. Comparing FIG. 6 and FIG. 7, the formula forms of the three additional geometry transformations are as follows:

Diagonal: $f_D(k,l) = f(l,k), c_D(k,l) = c(l,k)$,

Vertical flip: $f_v(k,l) = f(k, K-l-1), c_V(k,l) = c(k, K-l-1)$

Rotation: $f_R(k,l) = f(K-l-1, k), c_R(k,l) = c(K-l-1, k)$, (10)

where K is the size of the filter, and $0 \le k, l \le K-1$ are coefficients coordinates, such that location (0,0) is at the upper left corner of a block and location (K-1, K-1) is at the lower right corner of the block. When the diamond filter support is used, such as in the existing adaptive loop filter, the coefficients with a coordinate outside of the filter support will be set to 0. One technique for indicating and determining the geometry transformation index is to derive the geometry transformation index implicitly (e.g., without signaling) to avoid additional overhead. In a Geometric Adaptive Loop Filter (GALF), video encoder 200 and video decoder 300 may be configured to apply the transformations to the filter coefficients f (k,l) depending on gradient values calculated for that block. The relationship between the transformation and the four gradients calculated using equations (2)-(5) is described in Table 1. To summarize, the transformations are based on which one of two gradients (horizontal and vertical, or 45 degree and 135 degree gradients) is larger. Based on the comparison, more accurate direction information can be extracted. Therefore, different filtering results could be obtained due to transformation, while the overhead of filter coefficients is not increased.

TABLE 2

Mapping of Gradient and Transformations.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Information Signaling

One luma filter set includes filter information (including filter coefficients and clipping values) for all 25 classes. In one example, video encoder 200 and video decoder 300 may use one or more fixed filters to predict the filters for each class. In some examples, video encoder 200 may be configured to signal a flag for each class to indicate whether this class uses a fixed filter as its filter predictor. If yes (e.g., fixed filter is used), the fixed filter information is signaled.

To reduce the number of bits required to represent the filter coefficients, different classes can be merged. The information indicating which classes are merged may be provided by sending, for each of the 25 classes, an index $i_C$. Classes having the same index $i_C$ share the same filter coefficients that are coded. Video encoder 200 may be configured to signal the mapping between classes and filters for each luma filter set. Video encoder 200 and video decoder 300 may be configured to code the index $i_C$ with a truncated binary binarization method.

In some examples, video encoder 200 and video decoder 300 may be configured to predict a signaled filter from a previously signaled filter.

Adaptive Parameter Set

In VTM-5.0, adaptive parameter sets (APSs) are used to carry adaptive loop filter coefficients in bitstream. An adaptive parameter set may also be referred to as an adaptation parameter set. An APS is a syntax structure containing syntax elements that apply to slices as determined by syntax elements found in slice headers. In some examples, an APS may include a set of luma filters (e.g., adaptive loop filters for luma components) or a chroma filter (e.g., adaptive loop filters for chroma components) or both. In some examples, video encoder 200 and video decoder 300 may be configured to code indices of APSs used for the current tile group in the corresponding tile group header.

Coding Tree Block (CTB)-Based Filter Set Switch

In VTM-5.0, video encoder 200 and video decoder 300 may be configured to use filters generated from previously-coded tile groups for a current tile group in order to save overhead for filter signaling. Video encoder 200 and video decoder 300 may be configured to determine, for a luma coding tree block (CTB), a filter set from among fixed filter sets and filter sets from APSs. Video encoder 200 may be configured to signal the filter set index. Video decoder 300 may be configured to use a filter set for chroma CTBs from the same APS as the luma CTB. In a tile group header, slice header, and/or picture header, video encoder 200 may signal the APSs used for luma and chroma CTBs of a current tile group.

The above-described features illustrate that some example adaptive loop filter techniques lack flexibility to signal and determine filters for both luma and chroma CTBs. In view of these shortcomings and lack of flexibility of the techniques discussed above, this disclosure describes the following techniques that can improve upon the techniques above. Each of the techniques described below may be used independently or may be used together in any combination. The techniques of the disclosure may improve coding efficiency and/or reduce distortion in decoded/reconstructed video data by providing additional flexibility in selecting possible adaptive loop filters to apply for both luma and chroma components of video data. The techniques of the disclosure described below refer to examples using coding tree blocks (CTBs). However, it should be understood that the techniques of this disclosure are applicable for use with any size blocks, include CTBs, coding units, prediction units, sub-blocks, groups of samples, and/or individual samples.

In one example of the disclosure, video encoder 200 and video decoder 300 may be configured to choose and/or determine filters (e.g., adaptive loop filters) from among multiple APSs for chroma CTBs in one tile group, slice, and/or picture, chroma CTBs in groups of tiles or blocks, or chroma CTBs in slices. Video encoder 200 may be configured to signal one or more APS indices that are used for determining adaptive loop filters for chroma blocks (e.g., CTBs, sub-blocks, groups of samples, or a sample) in a header, for example a slice header or tile group header. In one example, video encoder 200 may be configured to signal the number of APSs used for chroma CTBs in the current slice or tile group and/or picture. Then, video encoder 200 may be configured to signal the indices of all used APSs. That is, video encoder 200 may be configured to signal indices for APSs for which video decoder 300 is to obtain an apply an adaptive loop filter.

For each chroma CTB where adaptive loop filtering is enabled, video encoder 200 may be configured to signal the filter index or APS index. Video decoder 300 may be configured to decode the filter index and/or APS index and apply the indicated adaptive loop filter. For example, video decoder 300 may obtain the adaptive loop filter for the chroma CTB that is associated with the signaled APS index.

In one example, video encoder 200 and video decoder 300 may be configured to share the same set of APS indices or the same sets of filters for Cb and Cr chroma components. In another example, video encoder 200 may be configured to signal a set of APS indices of filter sets used only for Cb component and may signal another set of APS indices that are only used for Cr component. Video decoder 300 may decode the APS indices of filter sets used only for Cb component and may decode the other set of APS indices that are only used for Cr component and may the apply adaptive loop filters to the Cr and Cb components based on the filters sets in the APSs indicated by the APS indices.

In some examples, video encoder 200 and video decoder 300 may be configured to apply an adaptive loop filter to Cb and Cr chroma components using separate filters. Instead of containing at most one chroma filter in an APS, an APS may have one filter (e.g., adaptive loop filter) for Cb and another filter for Cr.

In one example, when both filters are signaled, video decoder 300 may be configured to predict one filter from another signaled filter. Video encoder 200 may be configured to signal a flag to indicate whether the prediction is applied. If yes (e.g., prediction is applied), video encoder 200 may be configured to signal the difference between the filter and its predictor. Video decoder 300 may then add the signaled difference to the predictor to obtain the filter.

In another example, video encoder 200 may be configured to signal a flag to indicate whether both filters for the Cr and Cb components are the same.

In another example, video encoder 200 and video decoder 300 may determine a filter for a chroma CTB among multiple APSs. In one example, video encoder 200 and video decoder 300 may only use a filter from the same color component for a chroma CTB. In another example, video encoder 200 and video decoder 300 may use a filter for a chroma CTB from any color component.

In another example of the disclosure, video encoder 200 and video decoder 300 may be configured to code an APS that includes multiple luma filter sets. For example, video encoder 200 may be configured to encode a block of video data, and reconstruct the block of video data. Video encoder 200 may then apply an adaptive loop filter to the reconstructed block of the video data to create a filtered block of the video data. In accordance with the techniques of this disclosure, video encoder 200 may signal an adaptation parameter sets (APS) in an encoded video bitstream for the block of the video data, wherein the APS includes a plurality of adaptive loop filter sets, including the applied adaptive loop filter, for luma components of the block of the video data.

In a reciprocal manner, video decoder 300 may decode a block of the video data. Video decoder 300 may also receive an adaptation parameter sets (APS) in an encoded video bitstream for the block of the video data, wherein the APS includes a plurality of adaptive loop filter sets for luma components of the block of the video data. Video decoder 300 may then determine an adaptive loop filter from the plurality of adaptive loop filter sets in the APS to apply to the decoded block of the video data, and apply the determined adaptive loop filter to the decoded block of the video data to create a filtered block of the video data. By using an APS that includes a plurality of adaptive loop filter sets, video encoder 200 may have more flexibility in indicating the actual filter set used, and the actual adaptive loop filter from the filter set used, for different blocks of video data.

In one example, video encoder 200 and video decoder 300 may predict a luma filter set from one or multiple previously-coded filter sets. For example, video encoder 200 and video decoder 300 may predict an adaptive loop filter set from the APS for the current block from one or more previously-decoded adaptive loop filter sets. Video encoder 200 may be configured to signal a flag to indicate whether the prediction is applied. If yes (e.g., prediction is applied), video encoder 200 may be configured to signal the difference between the filter and its predictor. Video decoder 300 may then add the signaled difference to the predictor to obtain the filter.

When applying an adaptive loop filter, video encoder 200 may signal, for a CTB, which filter set and which merging table are used. A merging table may indicate the mapping between a class of filter (various blocks may have different classifications) and the filter to be used or filter set to be applied. In this example, video encoder 200 may be configured to signal one or more syntax elements that indicate the adaptive loop filter set and a merging table, wherein the merging table indicates a mapping between a class and the adaptive loop filter to be applied. In a reciprocal fashion, to determine an adaptive loop filter from the plurality of the adaptive loop filter sets in an APS, video decoder 300 may be configured to receive one or more syntax elements that indicate the adaptive loop filter set and a merging table. Video decoder 300 may then determine the adaptive loop filter from the indicated adaptive loop filter set and merging table.

In one example, an APS could include one filter set and multiple merging tables. That is, the plurality of adaptive loop filter sets in an APS are represented by a single adaptive loop filter set and multiple merging tables. In another example, an APS could include one merging table and multiple filter sets. That is, the plurality of adaptive loop filter sets in an APS are represented by a plurality of adaptive loop filter sets and a single merging table. In another example, an APS could include multiple filter sets and each set has one or more merging tables. That is, the plurality of adaptive loop filter sets in an APS are represented by a plurality of adaptive loop filter sets, wherein each adaptive loop filter set of the plurality of adaptive loop filter sets is associated with one or more merging tables.

In another example of the disclosure, video encoder 200 and video decoder 300 may be configured to code, for a luma CTB/block, multiple APS indices to indicate which APSs the filters (e.g., adaptive loop filters), merging table, and/or clipping values are from. For example, video encoder 200 may be configured to signal a plurality of APSs in the encoded video bitstream for a block of the video data, and signal a plurality of APS indices for the block of the video data, wherein each respective APS index of the plurality of APS indices indicates one or more of which of the plurality of APSs from which to determine the adaptive loop filter, a merging table, or clipping values for the block of the video data.

In a reciprocal fashion, video decoder 300 may be configured to receive a plurality of APSs in the encoded video bitstream for the block of the video data, receive a plurality of APS indices for the block of the video data, wherein each respective APS index of the plurality of APS indices indicates one or more of which of the plurality of APSs from which to determine the adaptive loop filter, a merging table, or clipping values for the block of the video data, and determine the adaptive loop filter, the merge table, and clipping values based on the plurality of APS indices.

In one example, one APS index, of the plurality of APS indices, indicates which APS the filters are from, another APS index, of the plurality of APS indices, indicates which APS the clipping values are from, and another APS index, of the plurality of APS indices, indicates the APS index where the merging table is from.

In another example, one APS index, of the plurality of APS indices, indicates the APS where the filters (e.g., filter coefficients) and clipping values are from, and another APS index, of the plurality of APS indices, indicates the APS where the merging table is from.

In another example, one APS index, of the plurality of APS indices, indicates the APS where the filters (e.g., filter coefficients) and merging table are from, and another APS index, of the plurality of APS indices, indicates the APS where the clipping values are from.

In another example, one APS index, of the plurality of APS indices, indicates the APS where the filters are from and another APS index, of the plurality of APS indices, indicates the APS where the clipping values and the merging table are from.

In another example, for a luma CTB/block, video encoder 200 and video decoder 300 may re-use the coefficients and clipping values from one APS, and signal/decode a flag to indicate/determine whether the new merging table is signaled. If the flag is true, a new merging table signaled for the CTB/block; otherwise, a merging table from an APS is used by video encoder 200 and video decoder 300.

In another example, for a luma CTB/block, video encoder 200 and video decoder 300 may re-use the coefficients and merging table from one APS, and signal/decode a flag to indicate/determine whether the new clipping values are signaled. If the flag is true, new clipping values are signaled for the CTB/block; otherwise, clipping values from an APS is used by video encoder 200 and video decoder 300.

In another example, for a luma CTB/block, video encoder 200 and video decoder 300 may re-use the coefficients from one APS, and signal a flag to indicate whether the new clipping values are signaled. If the flag is true, new clipping values are signaled for the CTB/block; otherwise, clipping values from an APS is used. In addition, a flag may be signaled to indicate whether the merging table is signaled. If the flag is true, a new merging table is signaled for the CTB/block; otherwise, the merging table from an APS is used by video encoder 200 and video decoder 300.

In another example, for a luma CTB/block, video encoder 200 and video decoder 300 may re-use merging tables from previously-coded CTBs/blocks and use filter coefficients from an APS.

In another example, for a luma CTB/block, video encoder 200 and video decoder 300 may use filters from multiple filter sets. One flag could be signaled to indicate whether the filters are from the same filter set. If not, for each filter, video encoder 200 may signal which filter set the filter is from.

In another example, for a CTB, video encoder 200 can use filter coefficients and clipping values from different filter sets. One flag could be signaled to indicate whether coefficients and clipping values are from the same filter sets. If not, the information about where coefficients and clipping values are obtained is signaled in a coded bitstream.

Figure 8:
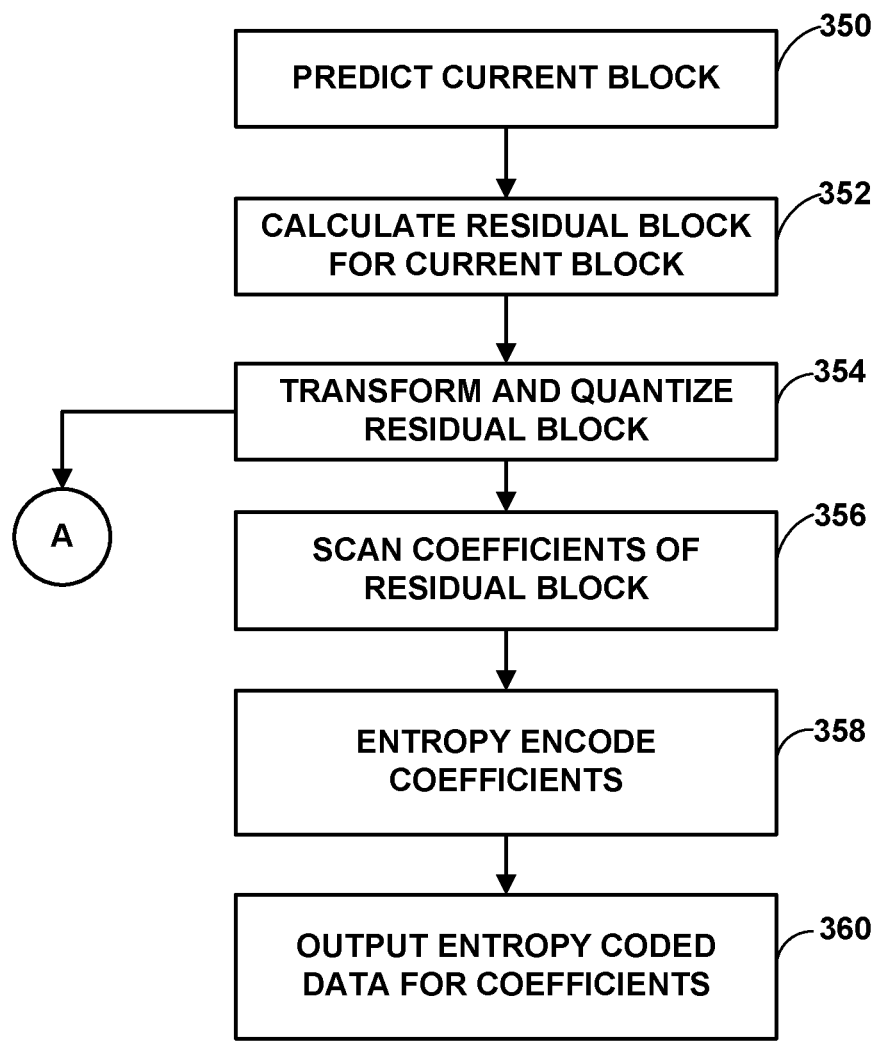
FIG. 8 is a flowchart illustrating an example encoding method of the disclosure.

FIG. 8 is a flowchart illustrating an example method for encoding a current block. The current block may comprise a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Video encoder 200 may then reconstruct the block and apply an adaptive loop filter (process A). Process A will be described in more detail with reference to FIG. 9. Next, video encoder 200 may scan the quantized transform coefficients of the residual block (356). During the scan, or following the scan, video encoder 200 may entropy encode the coefficients (358). For example, video encoder 200 may encode the coefficients using CABAC. Video encoder 200 may then output the entropy coded data of the block (360).

Figure 9:
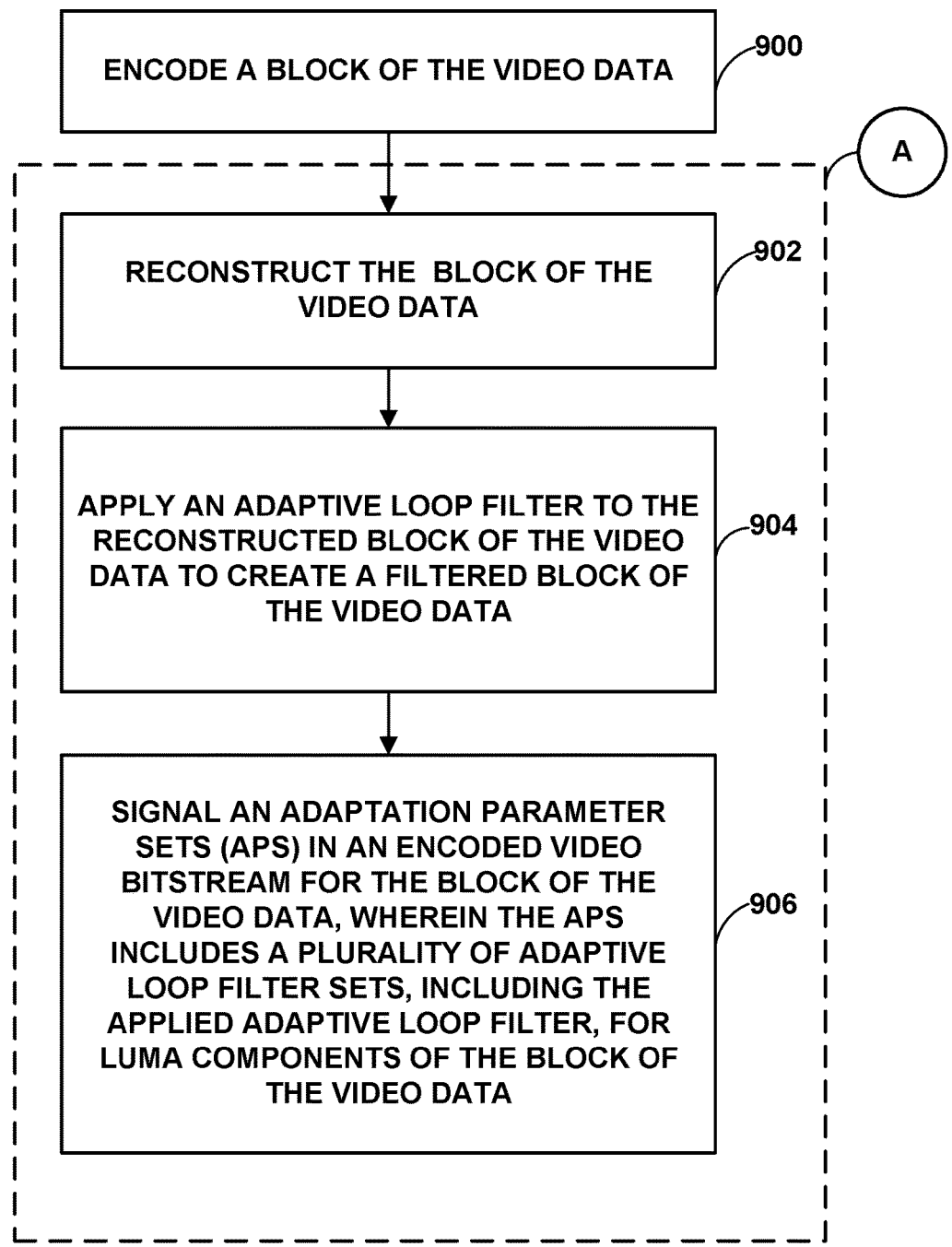
FIG. 9 is a flowchart illustrating an example encoding method of the disclosure in more detail.

FIG. 9 is a flowchart illustrating an example encoding method of the disclosure in more detail. One or more structural components of video encoder 200 may be configured to perform the techniques of FIG. 9, including filter unit 216.

In one example of the disclosure, video encoder 200 may be configured to encode a block of the video data (900). For example, video encoder 200 may encode the block of video data using the method of FIG. 8. Then video encoder 200 may perform process A from FIG. 8. For example, video encoder 200 may reconstruct the block of the video data (902), and filter unit 216 of video encoder 200 may apply an adaptive loop filter to the reconstructed block of the video data to create a filtered block of the video data (904). Video encoder 200 may also signal an adaptation parameter sets (APS) in an encoded video bitstream for the block of the video data, wherein the APS includes a plurality of adaptive loop filter sets, including the applied adaptive loop filter, for luma components of the block of the video data (906).

In one example, video encoder 200 may be configured to signal one or more syntax elements that indicate the adaptive loop filter set and a merging table, wherein the merging table indicates a mapping between a class and the adaptive loop filter to be applied. In one example, the plurality of adaptive loop filter sets are represented by a single adaptive loop filter set and multiple merging tables. In another example, the plurality of adaptive loop filter sets are represented by a plurality of adaptive loop filter sets and a single merging table. In another example, the plurality of adaptive loop filter sets are represented by a plurality of adaptive loop filter sets, wherein each adaptive loop filter set of the plurality of adaptive loop filter sets is associated with one or more merging tables.

In another example, video encoder 200 may be configured to signal a plurality of APSs in the encoded video bitstream for the block of the video data, and signal a plurality of APS indices for the block of the video data, wherein each respective APS index of the plurality of APS indices indicates one or more of which of the plurality of APSs from which to determine the adaptive loop filter, a merging table, or clipping values for the block of the video data.

Figure 10:
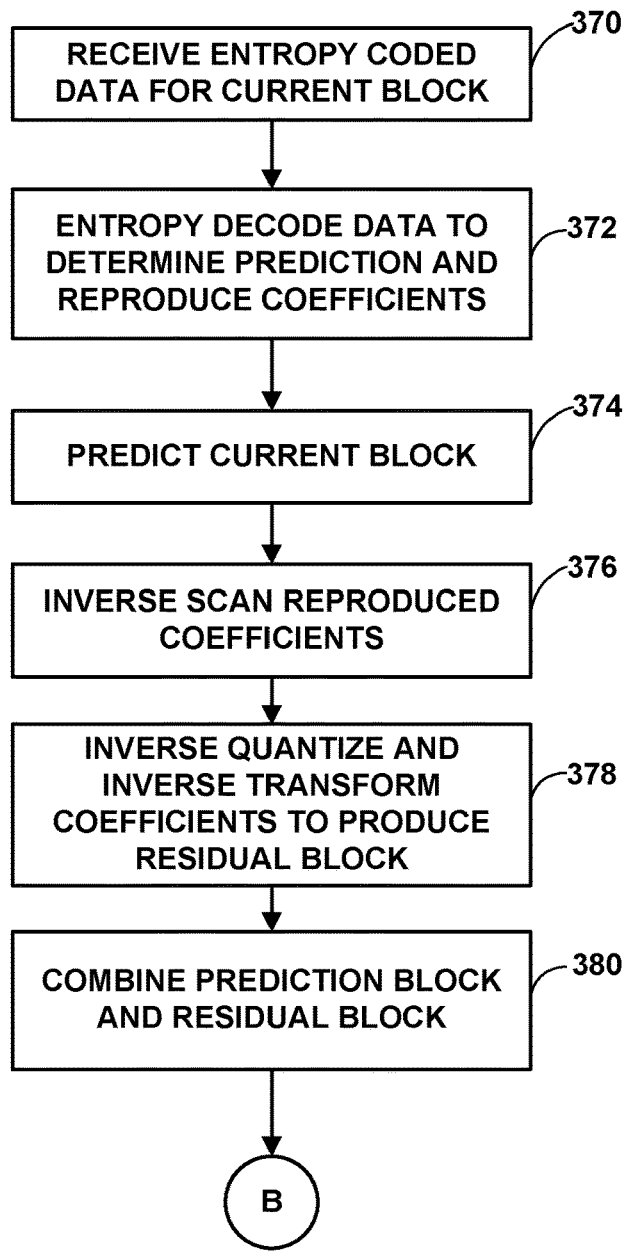
FIG. 10 is a flowchart illustrating an example decoding method of the disclosure.

FIG. 10 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 10.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380). Video decoder 300 may apply an adaptive loop filter to the decoded block (process B). Process B will be described in more detail with reference to FIG. 11.

Figure 11:
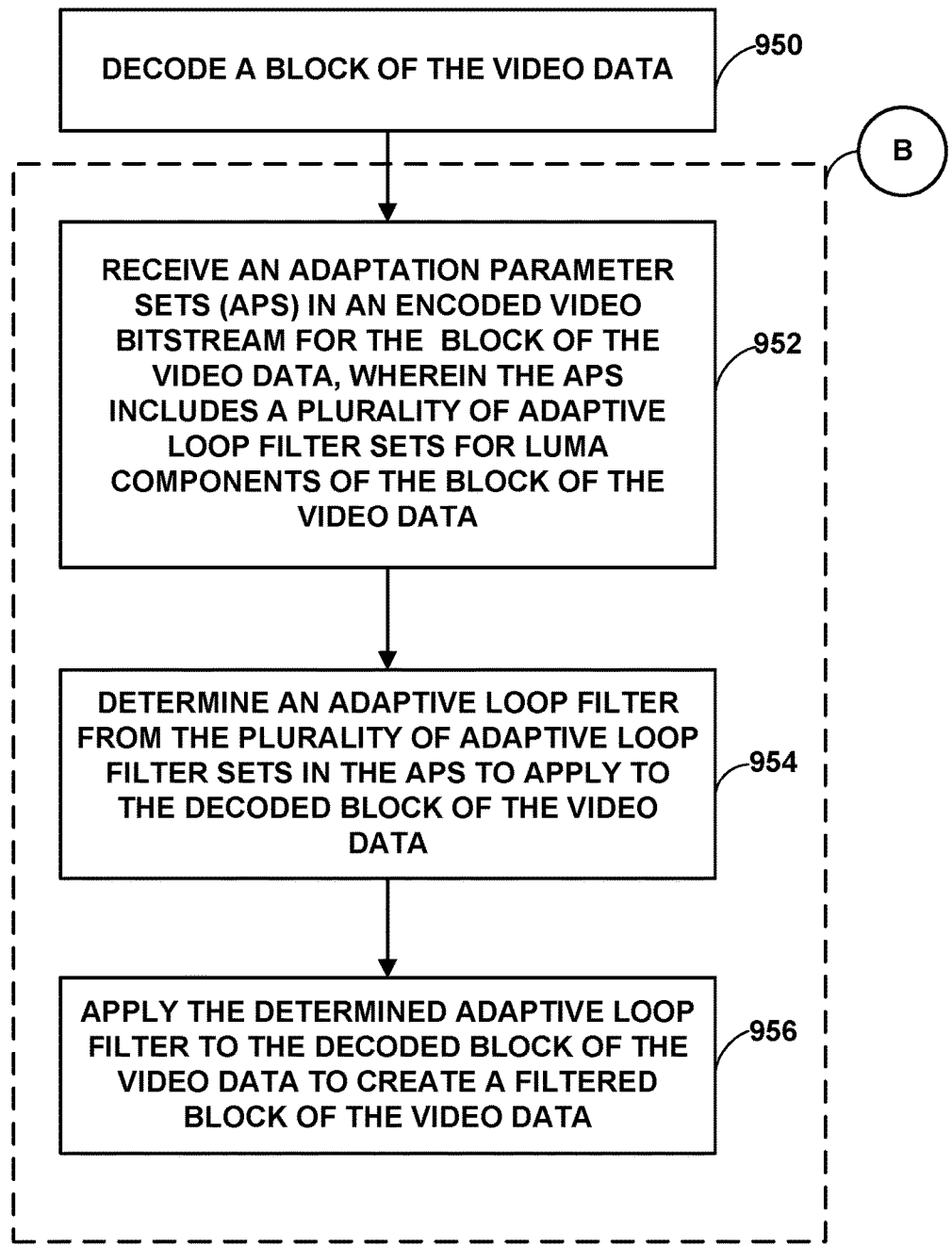
FIG. 11 is a flowchart illustrating an example decoding method of the disclosure in more detail.

FIG. 11 is a flowchart illustrating an example decoding method of the disclosure in more detail. One or more structural components of video decoder 300 may be configured to perform the techniques of FIG. 9, including filter unit 312.

In one example, video decoder 300 may be configured to decode a block of the video data (950). For example, video decoder 300 may decode the block of video data using the method of FIG. 10. Then video decoder 300 may perform process B from FIG. 10. For example, video decoder 300 may receive an adaptation parameter sets (APS) in an encoded video bitstream for the block of the video data, wherein the APS includes a plurality of adaptive loop filter sets for luma components of the block of the video data (952), and determine an adaptive loop filter from the plurality of adaptive loop filter sets in the APS to apply to the decoded block of the video data (954). Video decoder 300 may then apply the determined adaptive loop filter to the decoded block of the video data to create a filtered block of the video data (956).

In one example, video decoder 300 may be configured to predictive an adaptive loop filter set from the APS for the current block from one or more previously-decoded adaptive loop filter sets.

In another example, to determine the adaptive loop filter from the plurality of the adaptive loop filter sets in the APS, video decoder 300 may be configured to receive one or more syntax elements that indicate the adaptive loop filter set and a merging table, wherein the merging table indicates a mapping between a class and the adaptive loop filter to be applied to the decoded block of the video data, and determine the adaptive loop filter from the indicated adaptive loop filter set and merging table.

In one example, the plurality of adaptive loop filter sets are represented by a single adaptive loop filter set and multiple merging tables. In another example, the plurality of adaptive loop filter sets are represented by a plurality of adaptive loop filter sets and a single merging table. In another example, the plurality of adaptive loop filter sets are represented by a plurality of adaptive loop filter sets, wherein each adaptive loop filter set of the plurality of adaptive loop filter sets is associated with one or more merging tables.

In another example, video decoder 300 may be configured to receive a plurality of APSs in the encoded video bitstream for the block of the video data, receive a plurality of APS indices for the block of the video data, wherein each respective APS index of the plurality of APS indices indicates one or more of which of the plurality of APSs from which to determine the adaptive loop filter, a merging table, or clipping values for the block of the video data, and determine the adaptive loop filter, the merge table, and clipping values based on the plurality of APS indices.

Other examples of the disclosure are described below.

Example 1

A method of coding video data, the method comprising: reconstructing a coding tree block; determining an adaptive loop filter for the coding tree block according to one or more techniques of this disclosure; and applying the adaptive loop filter to the reconstructed coding tree block.

Example 2

The method of Example 1, wherein the coding tree block is a chroma coding tree block, and wherein determining the adaptive loop filter for the chroma coding tree block comprises: determining the adaptive loop filter for the chroma coding tree block from among multiple adaptive parameter sets.

Example 3

The method of Example 2, wherein the chroma coding tree block includes a Cr coding tree block and a Cb coding tree block, and wherein determining the adaptive loop filter for the chroma coding tree block comprises: determining the same adaptive loop filter for both the Cr coding tree block and the Cb coding tree block.

Example 4

The method of Example 2, wherein the chroma coding tree block includes a Cr coding tree block and a Cb coding tree block, and wherein determining the adaptive loop filter for the chroma coding tree block comprises: determining different adaptive loop filters for both the Cr coding tree block and the Cb coding tree block.

Example 5

The method of Example 1, further comprising: coding one or more of multiple adaptive parameter sets, wherein a first adaptive parameter sets include multiple adaptive loop filter sets for luma components.

Example 6

The method of Example 5, further comprising: predicting an adaptive loop filter set for a luma component from previously-coded filter sets.

Example 7

The method of Example 1, further comprising: coding an index to a first adaptive parameter set from among multiple adaptive filter sets, wherein the index indicates the first adaptive parameter set from which to determine one or more of an adaptive loop filter, a merging table, or clipping values.

Example 8

The method of Example 1, wherein the coding tree block is a luma coding tree block, and wherein determining the adaptive loop filter for the luma coding tree block comprises: re-using filter coefficients for the adaptive loop filter from a previously-coded adaptive parameter set.

Example 9

The method of Example 8, further comprising: coding clipping values for the luma coding tree block.

Example 10

The method of Example 1, wherein the coding tree block is a luma coding tree block, and wherein determining the adaptive loop filter for the luma coding tree block comprises: re-using a merging table for the adaptive loop filter from a previously-coded adaptive parameter set.

Example 11

The method of Example 1, further comprising: displaying a picture that includes the reconstructed coding tree block

Example 12

The method of any of Examples 1-11, wherein coding comprises decoding.

Example 13

The method of any of Examples 1-11, wherein coding comprises encoding.

Example 14

A device for coding video data, the device comprising one or more means for performing the method of any of Examples 1-13.

Example 15

The device of Example 14, wherein the one or more means comprise one or more processors implemented in circuitry.

Example 16

The device of any of Examples 14 and 15, further comprising a memory to store the video data.

Example 17

The device of any of Examples 14-16, further comprising a display configured to display decoded video data.

Example 18

The device of any of Examples 14-17, wherein the device comprises one or more of a camera, a computer, a mobile device, a broadcast receiver device, or a set-top box.

Example 19

The device of any of Examples 14-18, wherein the device comprises a video decoder.

Example 20

The device of any of Examples 14-19, wherein the device comprises a video encoder.

Example 21

A computer-readable storage medium having stored thereon instructions that, when executed, cause one or more processors to perform the method of any of Examples 1-13.

Example 22

Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode video data, the apparatus comprising:
   a memory configured to store the video data; and
   one or more processors in communication with the memory, the one or more processors configured to:
   decode a block of the video data;
   receive an adaptation parameter sets (APS) in an encoded video bitstream for the block of the video data, wherein the APS includes a plurality of adaptive loop filter sets for luma components of the block of the video data;
   determine an adaptive loop filter from the plurality of adaptive loop filter sets in the APS to apply to the decoded block of the video data; and
   apply the determined adaptive loop filter to the decoded block of the video data to create a filtered block of the video data.

2. The apparatus of claim 1, wherein the one or more processors are further configured to:
   predict an adaptive loop filter set from the APS for the block from one or more previously-decoded adaptive loop filter sets.

3. The apparatus of claim 1, wherein to determine the adaptive loop filter from the plurality of the adaptive loop filter sets in the APS, the one or more processors are further configured to:
   receive one or more syntax elements that indicate the adaptive loop filter set and a merging table, wherein the merging table indicates a mapping between a class and the adaptive loop filter to be applied to the decoded block of the video data; and
   determine the adaptive loop filter from the indicated adaptive loop filter set and merging table.

4. The apparatus of claim 1, wherein the plurality of adaptive loop filter sets are represented by a single adaptive loop filter set and multiple merging tables.

5. The apparatus of claim 1, wherein the plurality of adaptive loop filter sets are represented by a plurality of adaptive loop filter sets and a single merging table.

6. The apparatus of claim 1, wherein the plurality of adaptive loop filter sets are represented by a plurality of adaptive loop filter sets, wherein each adaptive loop filter set of the plurality of adaptive loop filter sets is associated with one or more merging tables.

7. The apparatus of claim 1, wherein the one or more processors are further configured to:
  receive a plurality of APSs in the encoded video bitstream for the block of the video data;
  receive a plurality of APS indices for the block of the video data, wherein each respective APS index of the plurality of APS indices indicates one or more of which of the plurality of APSs from which to determine the adaptive loop filter, a merging table, or clipping values for the block of the video data; and
  determine the adaptive loop filter, the merge table, and clipping values based on the plurality of APS indices.

8. The apparatus of claim 1, further comprising:
  a display configured to display a picture that includes the filtered block of the video data.

9. A method for decoding video data, the method comprising:
  decoding a block of the video data;
  receiving an adaptation parameter sets (APS) in an encoded video bitstream for the block of the video data, wherein the APS includes a plurality of adaptive loop filter sets for luma components of the block of the video data;
  determining an adaptive loop filter from the plurality of adaptive loop filter sets in the APS to apply to the decoded block of the video data; and
  applying the determined adaptive loop filter to the decoded block of the video data to create a filtered block of the video data.

10. The method of claim 9, further comprising:
  predicting an adaptive loop filter set from the APS for the block from one or more previously-decoded adaptive loop filter sets.

11. The method of claim 9, wherein determining the adaptive loop filter from the plurality of the adaptive loop filter sets in the APS comprises:
  receiving one or more syntax elements that indicate the adaptive loop filter set and a merging table, wherein the merging table indicates a mapping between a class and the adaptive loop filter to be applied to the decoded block of the video data; and
  determining the adaptive loop filter from the indicated adaptive loop filter set and merging table.

12. The method of claim 9, wherein the plurality of adaptive loop filter sets are represented by a single adaptive loop filter set and multiple merging tables.

13. The method of claim 9, wherein the plurality of adaptive loop filter sets are represented by a plurality of adaptive loop filter sets and a single merging table.

14. The method of claim 9, wherein the plurality of adaptive loop filter sets are represented by a plurality of adaptive loop filter sets, wherein each adaptive loop filter set of the plurality of adaptive loop filter sets is associated with one or more merging tables.

15. The method of claim 9, further comprising:
  receiving a plurality of APSs in the encoded video bitstream for the block of the video data;
  receiving a plurality of APS indices for the block of the video data, wherein each respective APS index of the plurality of APS indices indicates one or more of which of the plurality of APSs from which to determine the adaptive loop filter, a merging table, or clipping values for the block of the video data; and
  determining the adaptive loop filter, the merge table, and clipping values based on the plurality of APS indices.

16. The method of claim 9, further comprising:
  displaying a picture that includes the filtered block of the video data.

17. An apparatus configured to encode video data, the apparatus comprising:
  a memory configured to store the video data; and
  one or more processors in communication with the memory, the one or more processors configured to:
  encode a block of the video data;
  reconstruct the block of the video data;
  apply an adaptive loop filter to the reconstructed block of the video data to create a filtered block of the video data; and
  signal an adaptation parameter sets (APS) in an encoded video bitstream for the block of the video data, wherein the APS includes a plurality of adaptive loop filter sets, including the applied adaptive loop filter, for luma components of the block of the video data.

18. The apparatus of claim 17, wherein the one or more processors are further configured to:
  signal one or more syntax elements that indicate the adaptive loop filter set and a merging table, wherein the merging table indicates a mapping between a class and the adaptive loop filter to be applied.

19. The apparatus of claim 17, wherein the plurality of adaptive loop filter sets are represented by a single adaptive loop filter set and multiple merging tables.

20. The apparatus of claim 17, wherein the plurality of adaptive loop filter sets are represented by a plurality of adaptive loop filter sets and a single merging table.

21. The apparatus of claim 17, wherein the plurality of adaptive loop filter sets are represented by a plurality of adaptive loop filter sets, wherein each adaptive loop filter set of the plurality of adaptive loop filter sets is associated with one or more merging tables.

22. The apparatus of claim 17, wherein the one or more processors are further configured to:
  signal a plurality of APSs in the encoded video bitstream for the block of the video data; and
  signal a plurality of APS indices for the block of the video data, wherein each respective APS index of the plurality of APS indices indicates one or more of which of the plurality of APSs from which to determine the adaptive loop filter, a merging table, or clipping values for the block of the video data.

23. The apparatus of claim 17, further comprising:
  a camera configured to capture a picture that includes the block of the video data.

24. A method of encoding video data, the method comprising:
  encoding a block of the video data;
  reconstructing the block of the video data;
  applying an adaptive loop filter to the reconstructed block of the video data to create a filtered block of the video data; and
  signaling an adaptation parameter sets (APS) in an encoded video bitstream for the block of the video data, wherein the APS includes a plurality of adaptive loop filter sets, including the applied adaptive loop filter, for luma components of the block of the video data.

25. The method of claim 24, further comprising:
signaling one or more syntax elements that indicate the adaptive loop filter set and a merging table, wherein the merging table indicates a mapping between a class and the adaptive loop filter to be applied.

26. The method of claim 24, wherein the plurality of adaptive loop filter sets are represented by a single adaptive loop filter set and multiple merging tables.

27. The method of claim 24, wherein the plurality of adaptive loop filter sets are represented by a plurality of adaptive loop filter sets and a single merging table.

28. The method of claim 24, wherein the plurality of adaptive loop filter sets are represented by a plurality of adaptive loop filter sets, wherein each adaptive loop filter set of the plurality of adaptive loop filter sets is associated with one or more merging tables.

29. The method of claim 24, further comprising:
signaling a plurality of APSs in the encoded video bitstream for the block of the video data; and
signaling a plurality of APS indices for the block of the video data, wherein each respective APS index of the plurality of APS indices indicates one or more of which of the plurality of APSs from which to determine the adaptive loop filter, a merging table, or clipping values for the block of the video data.

30. The method of claim 24, further comprising:
capturing a picture that includes the block of the video data.

* * * * *